United States Patent [19]
Tejada et al.

[11] Patent Number: 5,914,818
[45] Date of Patent: Jun. 22, 1999

[54] OFFSET PROJECTION LENS FOR USE WITH REFLECTIVE SPATIAL LIGHT MODULATORS

[75] Inventors: John A. Tejada, Garland; Douglas W. Anderson, Richardson; Patrick A. Trotta, Plano, all of Tex.

[73] Assignee: Texas Instruments Incorporated, Dallas, Tex.

[21] Appl. No.: 08/972,646

[22] Filed: Nov. 18, 1997

[51] Int. Cl.⁶ .................................................. G02B 13/22
[52] U.S. Cl. ........................... 359/663; 359/745; 359/749
[58] Field of Search ................................... 359/663, 649, 359/648, 745, 749, 750, 751, 752, 753

[56] References Cited

FOREIGN PATENT DOCUMENTS

4-13108  1/1992  Japan ...................................... 359/663

*Primary Examiner*—Hung Xuan Dang
*Attorney, Agent, or Firm*—Charles A. Brill; Frederick J. Telecky, Jr.; Richard L. Donaldson

[57] ABSTRACT

An offset reverse telephoto projection lens that is telecentric in modulator space and has an air equivalent back focal distance of at least 3.3 inches and preferably at least 4.0 inches. The lens comprising, from the image side, a first objective lens group 408 having a negative power and a second telecentric lens group having a positive power. The second telecentric lens group 410 is telecentric in object space such that the image of the aperture is focused at infinity and light converges on the object plane perpendicular to the axis of the lens. Embodiments of the lens have a back focal distance to effective focal length ratio of at least 0.86:1, preferably at least 1.2:1, more preferably at least 1.3:1, still more preferably at least 4.08:1, and most preferably 5.0:1. The embodiments described have a field of view between 14 degrees and 73 degrees, have throw ratios of 1.2:1 to 7:1, and an overall length ranging from less than 5 inches to 12.5 inches.

30 Claims, 4 Drawing Sheets

OFFSET PROJECTION LENS FOR USE WITH REFLECTIVE SPATIAL LIGHT MODULATORS

FIELD OF THE INVENTION

This invention relates generally to projection optical systems, particularly to projection optical systems using reflective spatial light modulators, and more particularly to projection lenses for use with a digital micromirror device (DMD).

BACKGROUND OF THE INVENTION

Projection optical systems present many optical design challenges, several of which require a tradeoff between conflicting design goals. Foremost is the requirement of producing a high-quality image, characterized by low distortion, high resolution, high contrast ratio, high light throughput, and uniform screen illumination. In addition to the image quality requirement, the operational environment for many optical projectors introduces further constraints. For example, many projectors must project images large enough to be seen by many people, yet fit into a rather small conference room. This constraint requires the projection system to have a relatively wide field angle so that a large image may be produced with a short projection distance.

Additionally, the projection systems are rarely positioned level with the center of the projection screen. Because the projector system and the center of the screen are not located at the same elevation, the image may exhibit a keystoning effect. Keystoning occurs when an image is projected at an angle onto a screen causing the side of the image furthest from the projector to be wider than the side of the image closest to the projector. Keystoning often occurs when a table-top overhead projector projects an image upward onto a wall screen. Because the top of a projected square object will be wider than the bottom, the object will resemble the wedge-shaped piece at the crown of a stone archway called a keystone. Wide field angles exacerbate the problem of keystoning.

Existing lenses that have wide field angles, low distortion, high resolution, high contrast ratio, high light throughput, and uniform screen illumination are either too small format, or have too short of a back focal distance to be useful for DMD based projection systems. Therefore, there is a need in the art for a high resolution projection lens having a long back focal distance, a wide field angle, high contrast ratio, low distortion, high light throughput, and uniform screen illumination.

SUMMARY OF THE INVENTION

It is a primary object of the present invention to provide a high resolution projection lens having a long back focal distance, a wide field angle, a high contrast ratio, a high light throughput, and which provides uniform screen illumination and low distortion, and to provide an image display system that uses a high resolution projection lens having a long back focal distance and wide field angle. The disclosed projection lens has a long back focal distance enabling its use in conjunction with a prism assembly between the projection lens and an image source.

In a first embodiment of the present invention, an objective lens group and a telecentric lens group provide a back focal distance of at least 3.3 inches.

In another embodiment of the present invention, an objective lens group and a telecentric lens group provide a back focal distance of at least 4.3 inches.

Another embodiment of the present invention provides a reverse telephoto projection lens provides a back focal distance to effective focal length ratio of at least 0.875:1, preferably at least 1.0:1, more preferably at least 1.2:1, and most preferably at least 1.3:1, and according to one embodiment, 5.0:1.

According to another embodiment of the disclosed invention, a display system comprising a light source, a controller, a spatial light modulator, a prism assembly, and a reverse telephoto projection lens having a telecentric air equivalent back focal distance of at least 3.3 inches is disclosed. An additional embodiment of the disclosed display system has a telecentric back focal distance of 4.3 inches.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE PREFERRED EMBODIMENTS

Figure 1:
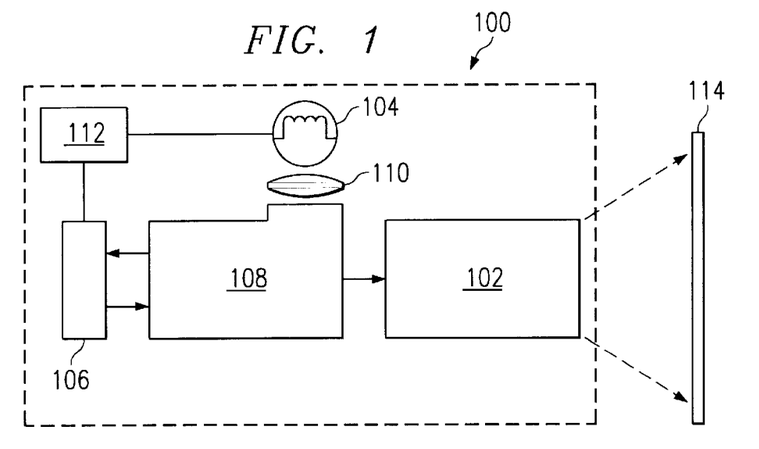
FIG. 1 is a block diagram of a projection display system showing a projection lens according to the present invention in conjunction with a prism assembly.

A schematic diagram of an image projection system 100 using a projection lens 102 according to the present invention is shown in FIG. 1. In FIG. 1, a light source 104, typically an arc-lamp, generates a beam of light which is focused onto a spatial light modulator (SLM) via a combination of prisms 108 and lenses 110. For simplicity, the lenses and prisms are represented in FIG. 1 by a single lens 110 and a single prism 108, but it is understood that the lens 110 and prism 108 of FIG. 1 may represent multiple configurations of lenses and prisms.

Lens 110 focuses light from source 104 onto the SLM 106, and the SLM 106 modulates the light as directed by controller 112. The modulated light beam passes though prism assembly 108 and is focused onto projection screen 114 by projection lens 102.

The prism assembly of FIG. 1 performs multiple functions depending on the type of projection system 100 in which it is used. First, the prism assembly 108 performs an illumination function by directing the light beam from the light source onto the SLM. The prism assembly also spatially separates the light beam shining on the SLM from the light beam reflected by the SLM. The illumination function is especially important in displays systems in which the SLM is a DMD because the typical DMD element operates by rotating a mirror element only +/−10°, creating a mere 20° separation between the incident and reflected light beams.

Figure 2:
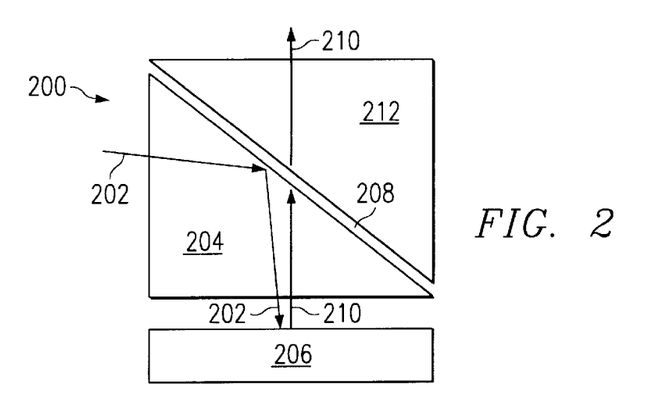
FIG. 2 is a side view of an illumination prism assembly which forms a portion of the prism assembly of FIG. 1.

FIG. 2 shows a side view of an illumination prism assembly 200, according to the prior art, for deflecting a light beam 202. The incident light beam 202 is totally internally reflected from the interface between a first prism 204 and an air gap 208. The reflected incident light beam 202 strikes the DMD 206 and is reflected by the DMD 206. If the mirrors of the DMD 206 in FIG. 2 are rotated counter-clockwise by an angle equal to half the angle of the incident light beam, the reflected light beam 210 will be normal to the surface of the DMD array. Therefore, for a 10° rotation of the DMD mirrors, the incident and reflected light beams diverge by 20°. By properly selecting the material and dimensions of the first prism 204, the reflected light beam 210 will not be reflected at the interface between the first prism 204 and the air gap 208, but will pass through the air gap 208 and compensation prism 212. As a result of the selective reflection of the incident 202 and reflected 210 beams, the illumination prism assembly 200 spatially separates the incident 202 and reflected 210 beams approximately 90°, enough to prevent interference between the light source 104 and the projection lens 102 shown in FIG. 1.

Figure 3:
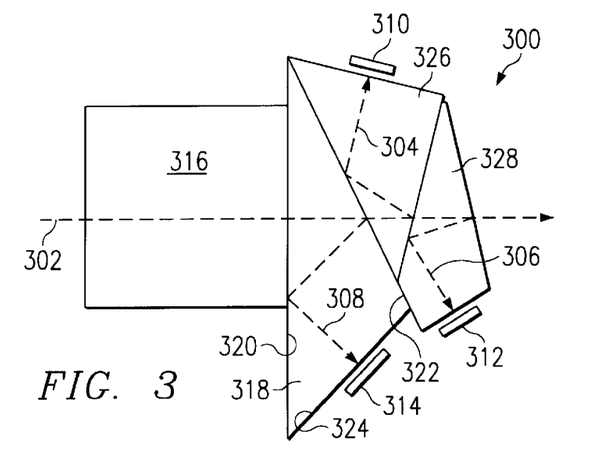
FIG. 3 is a side view of a color splitting prism assembly which forms a portion of the prism assembly of FIG. 1.

Another purpose of the prism assembly 108 of FIG. 1 is to act as a color splitter/combiner so that a single light source can be used to generate a full-color image. FIG. 3 shows one embodiment of a color splitting prism assembly 300, according to the prior art, for splitting a white-light light beam into three component chromatic light beams 304, 306, 308, and for recombining the three component light beams 304, 306, 308, after they are reflected by a spatial light modulator 310, 312, 314. In FIG. 3, light beam 302 enters the color splitting prism assembly 300 through a coupling prism 316. According to some embodiments, coupling prism 316 may be the illumination prism assembly 200 of FIG. 2. The light beam 302 passes through the coupling prism 316 and enters the first splitting prism 318 through a first face 320 and passes through the first splitting prism 318 to a second face 322.

The second face 322 of the first splitting prism 318 reflects a first component light beam 308 while allowing the remainder of light beam 302 to exit the first splitting prism 318. Typically, a dichroic color filter is deposited on the second face 322 of the first splitting prism 318 to cause the first component light beam 308 to reflect. The second face 322 of the first splitting prism 318 reflects the first color component light beam 308 at an angle sufficient to cause a total internal reflection of the first color component light beam 308 at the first face 320 of the first splitting prism 318. The first color component light beam 308 then exits the first splitting prism 318 through the third face 324 where it is selectively reflected by a spatial light modulator 314.

After being modulated and reflected by the spatial light modulator 314, the first color component light beam retraces its path through the first splitting prism 318 and the coupling prism 316 before being separated from the incident light beam 302 by an illumination prism. Two additional color component light beams 304, 306, are separated from the light beam 302 by a second and third splitting prism 326, 328 and modulated by two additional spatial light modulators 310, 312. Portions of light beam 302 that are not reflected by the three splitting prisms 318, 326, 328, such as any non-visible color components, pass through the color splitting prism assembly 300.

Figure 4:
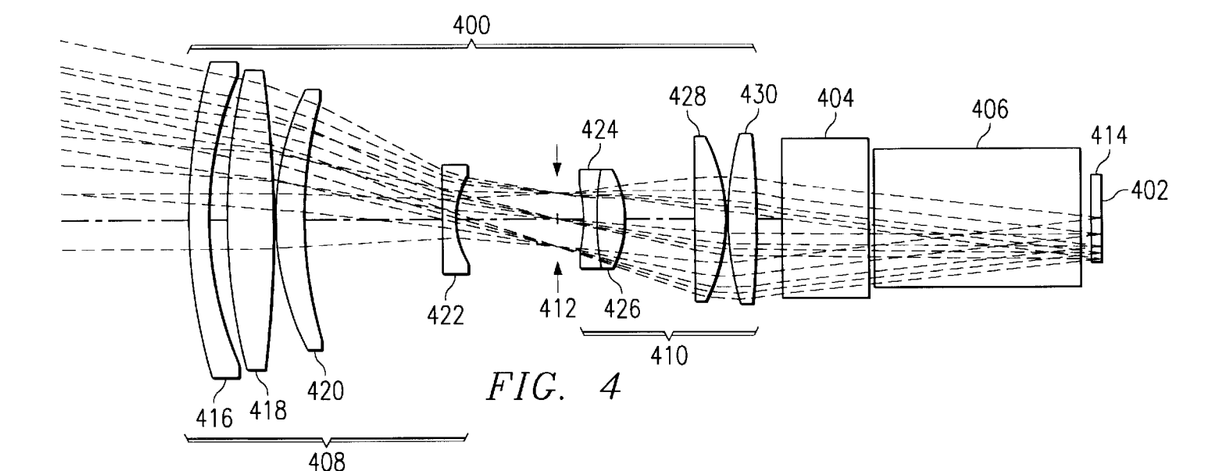
FIG. 4 is a schematic view of a projection lens assembly according to a first embodiment of the present invention, shown in conjunction with an illumination prism assembly and a color splitting prism assembly.

FIG. 4 is a schematic diagram of a projection lens 400 according to a first embodiment of the present invention. Projection lens 400 has wide field angles and high light throughput with low distortion, and projects a high resolution image with low intensity ghost reflections, while providing uniform screen illumination. The projection lens 400 also has a long back focal distance and is telecentric in object space, thereby enabling the use of projection lens 400 with a reflective light modulator 402 and a large prism assembly 108. In FIG. 4, the prism assembly includes both an illumination prism assembly 404, and a color splitting prism assembly 406. As discussed above, the illumination prism assembly 404 separates the incident and reflected beams of light while the color splitting prism assembly 406 separates the incident beam into three chromatic beams of light and recombines the three chromatic beams of light after they are modulated. The projection lens 400 will function without either or both of the separate prism sub-assemblies 404 and 406, but the embodiment detailed in Table 1 compensates for the aberrations induced by the prisms.

The use of illumination prism assembly 404 requires the lens to operate with the chief rays telecentric at the SLM in order to maximize the light throughput without compromising the action of the TIR prism. The use of either prism assembly requires the lens to have a long back focal distance. Because projection lenses can be used in a variety of circumstances, a range of focal lengths is needed. In particular, projection lenses to provide throw ratios in the range 1.2:1 to 7:1, where throw ratio is defined as the ratio of projection distance to screen width, would cover most requirements. Moreover, two DMD formats are presently used for projection systems. The SVGA format has a nominal 848×600 pixel array and has a diagonal dimension of about 0.7 inches. The SXGA format has a nominal array of 1280×1024 pixels and has a diagonal dimension of about 1.1 inches. In order to accommodate an offset of ½ the vertical array height, these lenses must be designed for a minimum full width at the DMD of 1.0 inches for SVGA and 1.6 inches for SXGA. Because the physical arrays are different sizes for the two formats, the associated prism assemblies have different dimensions; for the SVGA format, the prism assembly requires the projection lens to have an air equivalent back focal distance (BFD) of 3.3 inches, while for the SXGA format, the prism assembly represents an air equivalent BFD of 4.3 inches. This unique set of requirements has led to a family of unique projection lens designs. To achieve the throw ratio requirements, the fields-of-view of the lenses are between 14 and 73 degrees. For SVGA, the ratio of BFD to effective focal length (EFL) falls in the range of 0.84 to 5.0, while for the SXGA format, BFD/EFL is in the range from 0.76 to 4.44. The family of projection lens designs resulting from these requirements all are of the reverse telephoto type, are telecentric at the DMD, have low distortion and high contrast, and have long back focal distances relative to their effective focal lengths.

Projection lens 400 shown in FIG. 4 has a full field-of-view of 25 degrees, yielding a throw ratio of 3.5:1. It is designed for the SXGA format, so it has an air equivalent back focal distance of 4.5 inches. The overall length from the front vertex of the first lens to the rear vertex of the last lens is less than 10.5 inches. For this design, distortion is less than 0.75%, and the principal image to ghost intensity ratio is greater than 500:1.

Projection lens 400 includes two groups of lens elements 408, 410 separated by an aperture stop 412. The first group of lens elements is called the objective lens group 408 and, according to the embodiment shown in FIG. 4, is composed of four lens elements. The second lens group 410 is a telecentric lens group. A telecentric lens focuses the image of the aperture at infinity.

In addition to the objective lens group 408, the telecentric lens group 410, the illumination prism assembly 404, the color splitting prism assembly 406, and the reflective spatial light modulator 402, FIG. 4 also shows a cover or window 414 over the reflective light modulator 402. The window 414 is typically a part of the reflective spatial light modulator 402 package. For example, DMD spatial light modulators are hermetically sealed in a ceramic integrated circuit package with a window 414 on the top of the package to allow light to enter and leave the package.

The illumination prism assembly 404, the color splitting prism assembly 406, and the window 414, are the optical equivalent to a 1.670 inch thick. piece of BK7 Schott glass, a 3.937 inch thick piece of BK7 Schott glass, and a 0.118 inch thick piece of ZKN7 Schott glass respectively. Additionally, there is a 0.500 inch air gap between the projection lens and the illumination prism assembly 404, a 0.079 inch air gap between the illumination prism assembly 404 and the color splitting prism assembly 406, a 0.157 inch air gap between the color splitting prism assembly 406 and the window 414, and a 0.020 inch air gap between the window 414 and the spatial light modulator 402.

The first embodiment of the disclosed projection lens shown in FIG. 4, uses all spherical lenses and is detailed in Table 1. The objective lens group 408 includes four lenses. The front lens 416 in the objective group 408 is a negative lens. For the purposes of this disclosure, the "front" of the lens is toward the objective end or projection end and opposite the spatial light modulator end, or back end. Furthermore, the curvature of the surface, or radius, is positive if the center of curvature is on the modulator, or back, side of the lens. Therefore, a front surface of a lens is convex if it has a positive radius and concave if it has a negative radius, while the back surface of a lens is convex if it has a negative radius and concave if it has a positive radius. Additionally, the spacing between one lens and the next lens is measured from the rear vertex of the first lens to the front vertex of the next lens. The second lens 418 in the objective group 408 is a positive lens. The third lens 420 in the objective group 408 is a positive lens. The fourth lens 422 in the objective group 408 is a negative lens. The objective lens group 408 is located 1.862 inches in front of the aperture stop 412 .

The telecentric lens group 410 also includes four lenses. The first lens 424 in the telecentric group 410 is a negative lens. The second lens 426 in the telecentric group 410 is a positive lens and is cemented to the first lens 424 to form a cemented doublet. The cemented doublet helps to correct chromatic aberrations in the projection lens assembly 400. The third lens 428 in the telecentric group 410 is a positive lens. The fourth lens 430 in the telecentric group 410 is a positive lens. The overall length of the projection lens assembly 400 of the preceding embodiment is 10.323 inches from the front surface of the first lens 416 of the objective group 408 to the rear surface of the fourth lens 430 of the telecentric group 410.

The dimensions of each lens in the embodiment described above are listed in Table 1 below. In addition to exceeding the requirements listed above for projection lens 102, projection lens 400 operates at about f3 with no vignetting and has a nominal modulation transfer function (MTF) of 0.78 at 33 lp/mm on axis. The off-axis MTF is 0.55 in the tangential direction and 0.71 in the radial orientation, both at 33 lp/mm. The magnification of projection lens 400 is approximately 56×. The ratio of BFD divided by EFL is greater than 1.30:1.

TABLE 1

| Object | Front Radius of Curvature | Rear Radius of Curvature | Diameter | Thickness | Material |
| --- | --- | --- | --- | --- | --- |
| Lens 416 | 10.05510 | 6.60550 | 2.825 | 0.350 | BAF50 |
| Air Gap | | | | 0.347 | |
| Lens 418 | 10.77500 | −27.70000 | 2.700 | 0.850 | LAF2 |
| Air Gap | | | | 0.050 | |
| Lens 420 | 5.55600 | 7.15573 | 2.340 | 0.500 | SF4 |
| Air Gap | | | | 2.681 | |
| Lens 422 | −14.41800 | 1.50240 | 0.950 | 0.220 | FK5 |
| Air Gap | | | | 1.862 | |
| Stop | | | 0.514 | | |
| Air Gap | | | | 0.568 | |
| Lens 424 | −4.01700 | 4.01700 | 0.825 | 0.250 | SF4 |
| Lens 426 | 4.01700 | −2.42750 | 0.910 | 0.500 | FK5 |
| Air Gap | | | | 1.222 | |
| Lens 428 | Infinite | −3.33950 | 1.475 | 0.550 | SK4 |
| Air Gap | | | | 0.050 | |
| Lens 430 | 5.66550 | −19.71790 | 1.500 | 0.500 | SK16 |

The projection lens assembly 400 is suitable for projecting an image from an SXGA format DMD or other SLM 402. SXGA format devices have 1024 rows of pixels, with 1280 pixels in each row. The field of view at the SLM is approximately 1.5 inches diagonally. The large field of view allows about a 50% offset in the vertical field of view which helps to reduce keystoning when the projector is used to project onto a screen that is not centered on the axis of projection.

Figure 5:
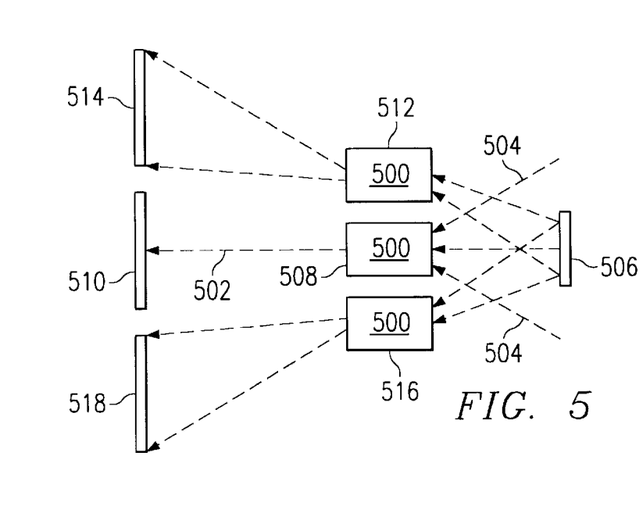
FIG. 5 is a schematic view of the projection lens assembly of FIG. 4 showing the benefits of offset projection.

FIG. 5 is a simplified pictorial representation of the operation of offset projection lens systems having greatly exaggerated offset angles. Offset projection occurs when the format of the projection lens 500, or the maximum object the projection lens 500 is capable of imaging, is larger than the actual object being imaged and the object being imaged is not located on the lens axis 502. For example, projection lens 500 has a field of view, as shown by rays 504 that, at the plane of the modulator 506 is much larger than the object being imaged. When the projection lens 500 is in position 508, the image of modulator 506 is projected by the projection lens 500 onto the image plane at location 510. If the projection lens 500 is moved upward in relation to modulator 506 to position 512, the image of the modulator 506 is shifted, or offset, across the image plane to location 514. Likewise, if the projection lens 500 is moved downward in relation to modulator 506 to position 516, the image of the modulator 506 is shifted, or offset, across the image plane to location 518.

Offset projection can be used to prevent image keystoning when the image projector is not at the same elevation as the center of the projection screen. For example, when an on-axis projection system is mounted to a conference room ceiling and projects downward to the center of a wall mounted projection screen, the bottom of the image is wider than the top. If an offset projection lens 500 is used, however, the projection lens 500 is shifted down relative to the modulator 506 causing the image to be shifted down while retaining the correct image dimensions. Likewise, if the projection lens 500 is shifted upward relative to the modulator 506, the image of the modulator projected upward, allowing a table-top projector to project an image upward onto a wall mounted screen without keystoning. In FIG. 5, the field of view shown by rays 504 is approximately four times as large as the modulator 506 being imaged. In practice, a lens with 400% offset is too expensive for most applications and the maximum offset is 200% or less, typically less than 150%.

Figure 6:
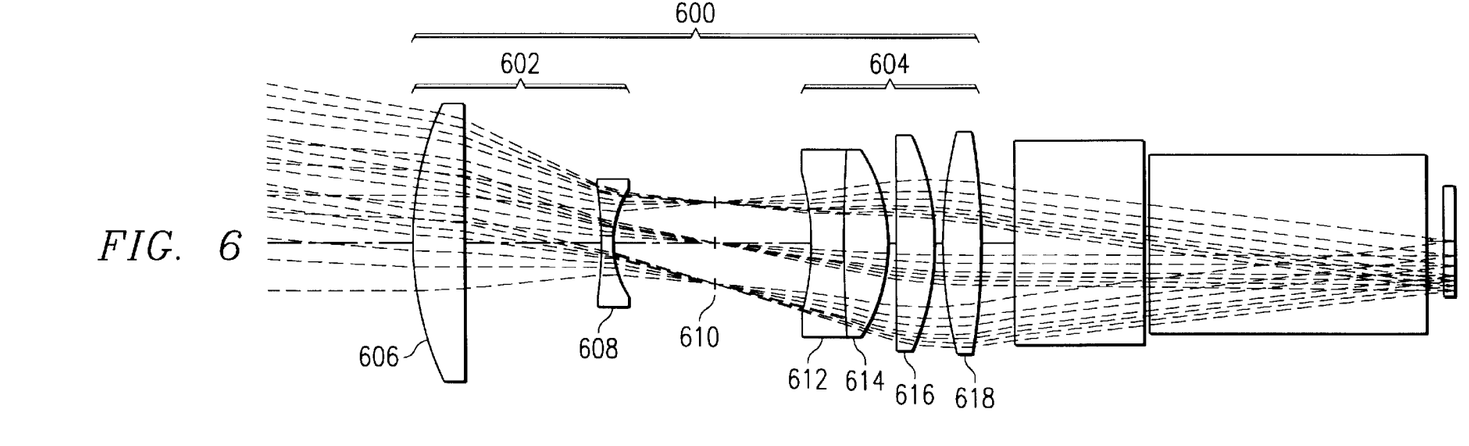
FIG. 6 is a schematic view of a projection lens assembly according to a second embodiment of the present invention, shown in conjunction with an illumination prism assembly and a color splitting prism assembly.

A second embodiment of a projection lens that is telecentric in modulator, or object space, is shown in FIG. 6 and detailed in Table 2. Projection lens assembly 600, comprising a two-lens objective lens group 602 and a four-lens telecentric lens group 604, has a field of view of at least 20 degrees, a back focal distance of 3.30 inches, an overall length of 5.2 inches, a distortion of less than 0.5%, and a principal image to ghost image intensity ratio of greater than 1100:1.

As in the first embodiment discussed above, all of the lenses in the second embodiment are spherical lenses. The front lens 606 in the objective lens group 602 is a positive lens. The second lens 608 in the objective lens group 602 is a negative lens. The objective lens group 602 is located 0.901 inches in front of the aperture stop 610.

The telecentric lens group 604 also includes four lenses. The first lens 612 in the telecentric group 604 is a negative lens 0.817 inches behind the aperture 610. The second lens 614 in the telecentric group 604 is a positive lens. And is cemented to the first lens 612 to form a cemented doublet. The cemented doublet helps to correct chromatic aberrations in the projection lens assembly 600. The third lens 616 in the telecentric group 604 is a positive lens. The fourth lens 618 in the telecentric group 604 is a positive lens. The overall length of the projection lens assembly 600 of the preceding embodiment is 5.472 inches from the front surface of the first lens 606 of the objective group 604 to the rear surface of the last lens 618 of the telecentric group 604.

Projection lens assembly 600, as described above and detailed in Table 2, has a throw ratio, the projection distance divided by the width of the projected image, of 5:1 and a magnification of approximately 260×. Projection lens 600 operates at about f/3.0 with no vignetting and has a nominal MTF of 0.82 on axis, at 33 lp/mm. The off-axis MTF is 0.54 in the tangential direction and 0.81 in the radial orientation at 33 lp/mm. The projection lens 600 is designed for use with an SVGA (800×600) array with full vertical offset and has a BFD to EFL ratio of approximately 1.2:1.

TABLE 2

| Object | Front Radius of Curvature | Rear Radius of Curvature | Thickness | Material |
| --- | --- | --- | --- | --- |
| Lens 606 | 3.06429 | −42.67121 | 0.415 | LAK9 |
| Air Gap | | | 1.020 | |
| Lens 608 | −4.15329 | 1.04069 | 0.118 | FK5 |
| Air Gap | | | 0.901 | |
| Stop | | | | |
| Air Gap | | | 0.817 | |
| Lens 612 | −2.69548 | 0.47244 | 0.472 | SF4 |
| Lens 614 | 7.30016 | −2.01276 | 0.414 | FK5 |
| Air Gap | | | 0.079 | |
| Lens 616 | 41.01841 | −2.45734 | 0.480 | BK7 |

TABLE 2-continued

| Object | Front Radius of Curvature | Rear Radius of Curvature | Thickness | Material |
| --- | --- | --- | --- | --- |
| Air Gap | | | 0.079 | |
| Lens 618 | 4.49379 | −8.38838 | 0.362 | SK16 |

Figure 7:
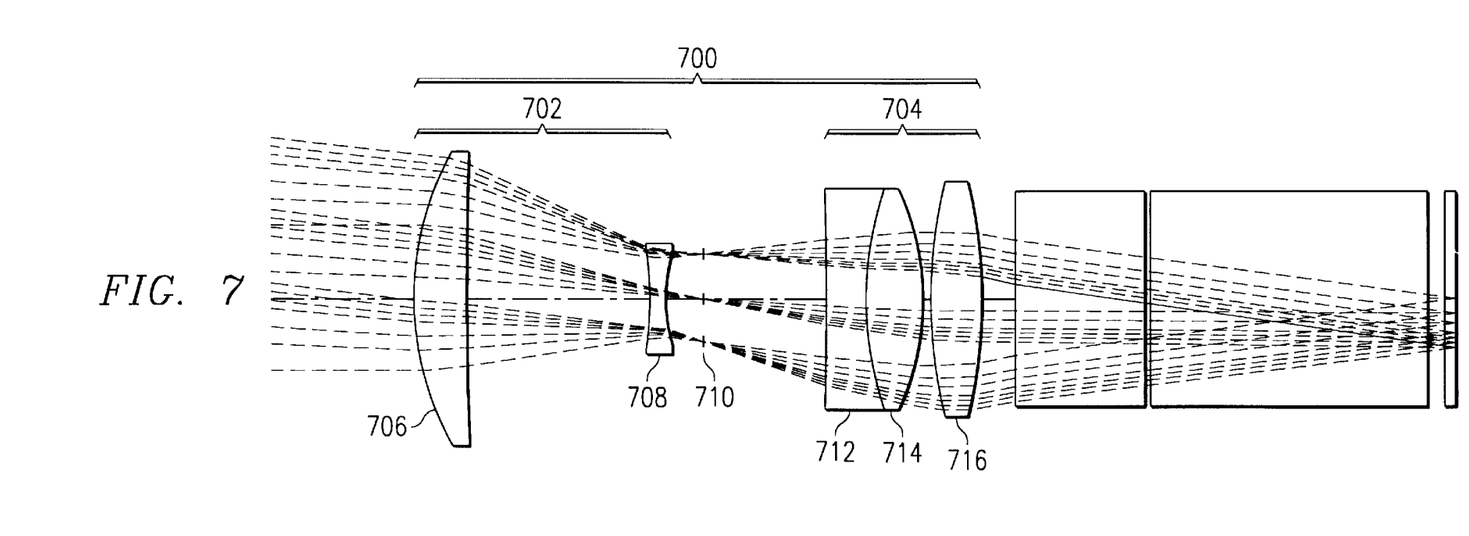
FIG. 7 is a schematic view of a projection lens assembly according to a third embodiment of the present invention, shown in conjunction with an illumination prism assembly and a color splitting prism assembly.

A third embodiment of a projection lens 700 that is telecentric in modulator space, or object space, is shown in FIG. 7 and detailed in Table 3. Projection lens assembly 700, comprising a two-lens objective lens group 702 and a three-lens telecentric lens group 704, has a field of view of at least 14 degrees, a back focal distance of 3.30 inches, an overall length of less than 5.0 inches, a distortion of less than 1.0%, and a principal image to ghost image intensity ratio of nearly 1500:1.

As in the first two embodiments discussed above, all of the lenses in the third embodiment are spherical lenses. The front lens 706 in the objective lens group 702 is a positive lens. The second lens 708 in the objective lens group 702 is a negative lens. The objective lens group 702 is located 0.264 inches in front of the aperture stop 710.

The telecentric lens group 704 includes three lenses. The first lens 712 in the telecentric group 704 is a negative lens 1.239 inches behind the aperture stop 710. The second lens 714 in the telecentric group 704 is a positive lens and is cemented to the first lens 712 to form a cemented doublet. The cemented doublet helps to correct chromatic aberrations in the projection lens assembly 700. The third lens 716 in the telecentric group 704 is a positive lens. The overall length of the projection lens assembly 700 of the preceding embodiment is 4.952 inches from the front surface of the first lens 706 of the objective group 702 to the rear surface of the last lens 716 of the telecentric group 704.

Projection lens assembly 700, as described above and detailed in Table 3, has a throw ratio of 7:1 and a magnification of approximately 263×. Projection lens 700 operates at about f/3.0 with no vignetting and has a nominal MTF of 0.85 on axis, at 33 lp/mm. The off-axis MTF is 0.47 in the tangential direction and 0.65 in the radial orientation at 33 lp/mm. Projection lens 700 is also designed for SVGA systems with full vertical offset, and has a BFD/EFL ratio of approximately 0.86:1.

TABLE 3

| Object | Front Radius of Curvature | Rear Radius of Curvature | Thickness | Material |
| --- | --- | --- | --- | --- |
| Lens 706 | 2.94764 | 86.28935 | 0.472 | LAF2 |
| Air Gap | | | 1.348 | |
| Lens 708 | −3.30622 | 1.63350 | 0.118 | SF8 |
| Air Gap | | | 0.264 | |
| Stop 710 | | | | |
| Air Gap | | | 1.239 | |
| Lens 712 | −11.64851 | 3.30446 | 0.472 | SF4 |
| Lens 714 | 3.30446 | −2.74592 | 0.488 | SK16 |
| Air Gap | | | 0.079 | |
| Lens 716 | 4.78707 | −4.76455 | 0.472 | LAF2 |

Figure 8:
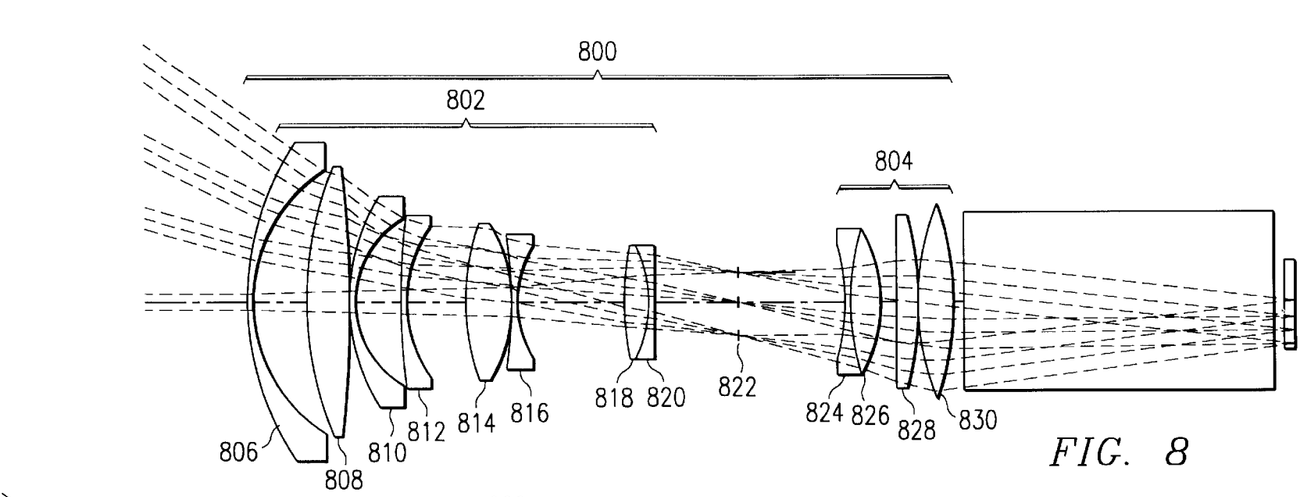
FIG. 8 is a schematic view of a projection lens assembly according to a fourth embodiment of the present invention, shown in conjunction with an illumination prism assembly and a color splitting prism assembly.

A fourth embodiment, shown as projection lens 800 in FIG. 8, also uses only spherical lenses. The front lens 806 in the objective lens group 802 is a negative lens. The second lens 808 in the objective lens group 802 is a positive lens. The third lens 810 in the objective lens group 802 is a negative lens. The fourth lens 812 in the objective lens group 802 is a negative lens. The fifth lens 814 in the objective lens group 802 is a positive lens. The sixth lens 816 in the objective lens group 802 is a negative lens. The seventh lens 818 in the objective lens group 802 is a positive lens. The eighth lens 820 in the objective lens group 802 is a negative lens and is cemented to the seventh lens 818 to form a cemented doublet. The cemented doublet helps to correct chromatic aberrations in the projection lens assembly 800. The objective lens group 802 is located 1.497 inches in front of the aperture stop 822.

The telecentric lens group 804 includes four lenses. The first lens 824 in the telecentric group 804 is a negative lens. The second lens 826 in the telecentric group 804 is a positive lens and is cemented to the first lens 824 to form a cemented doublet. The cemented doublet helps to correct chromatic aberrations in the projection lens assembly 800. The third lens 826 in the telecentric group 804 is a positive lens. The fourth lens 830 in the telecentric group 804 is a positive lens. The overall length of the projection lens assembly 800 of the preceding embodiment is approximately 12.5 inches from the front surface of the first lens 806 of the objective group 802 to the rear surface of the last lens 830 of the telecentric group 804.

Projection lens assembly 800, as described above and detailed in Table 4, has a throw ratio of 1.2:1, a field of view of 72 degrees, and a magnification of approximately 100×. Projection lens 800 operates at about f/3.0 with no vignetting and has a nominal MTF of 0.50 on axis, at 33 lp/mm. The off-axis MTF is 0.04 in the tangential direction and 0.38 in the radial orientation at 33 lp/mm. Projection lens 800 is designed for SXGA systems with full vertical offset, an air equivalent back focal distance of 4.34 inches, and has a BFD/EFL ratio of approximately 4.08:1.

TABLE 4

| Object | Front Radius of Curvature | Rear Radius of Curvature | Thickness | Material |
| --- | --- | --- | --- | --- |
| Lens 806 | 5.26770 | 2.80900 | 0.100 | SF4 |
| AirGap | | | 0.960 | |
| Lens 808 | 6.35300 | −20.32800 | 0.750 | SF1 |
| Air Gap | | | 0.020 | |
| Lens 810 | 3.67790 | 1.85060 | 0.100 | SK5 |
| Air Gap | | | 0.785 | |
| Lens 812 | 12.25600 | 2.53200 | 0.080 | SK5 |
| Air Gap | | | 1.055 | |
| Lens 814 | 3.93700 | −2.87440 | 0.800 | BK7 |
| Air Gap | | | 0.020 | |
| Lens 816 | −5.95600 | 2.30600 | 0.080 | LAK10 |
| Air Gap | | | 1.916 | |
| Lens 818 | 5.32530 | −2.08920 | 0.425 | SF1 |
| Lens 820 | −2.08920 | Infinite | 0.080 | LAK10 |
| Air Gap | | | 1.497 | |
| Stop 822 | | | | |
| Air Gap | | | 1.904 | |
| Lens 824 | −4.19100 | 2.89770 | 0.080 | SF4 |
| Lens 826 | 2.89770 | −2.89770 | 0.550 | BK7 |
| Air Gap | | | 0.287 | |
| Lens 828 | 36.92500 | −6.11980 | 0.400 | BK7 |
| Air Gap | | | 0.020 | |
| Lens 830 | 4.39150 | −5.76320 | 0.600 | SK5 |

Figure 9:
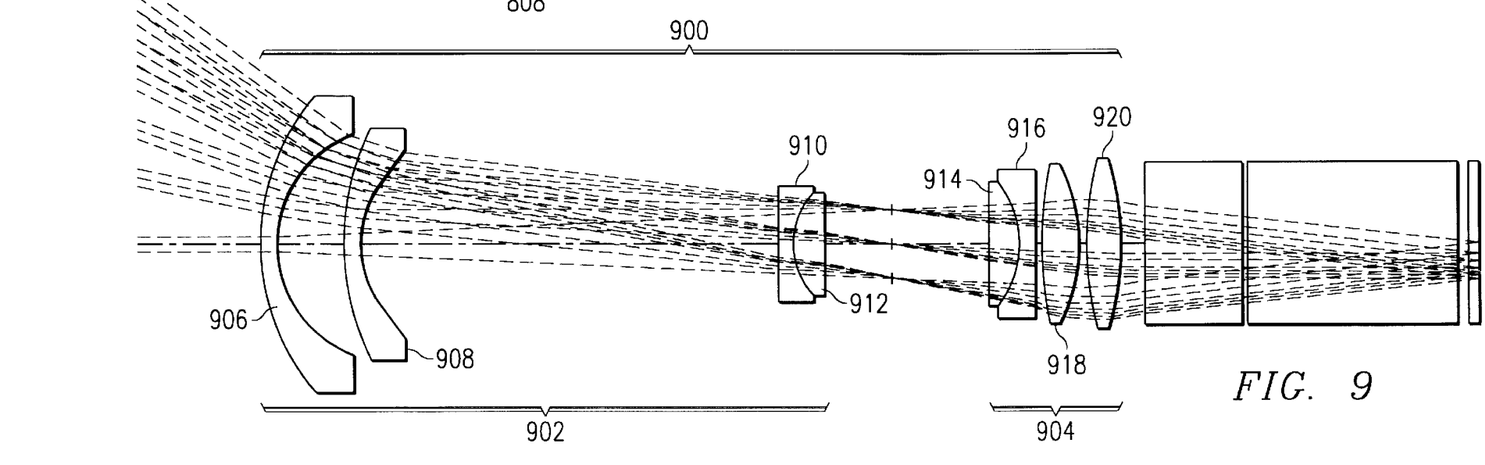
FIG 9 is a schematic view of a projection lens assembly according to a fifth embodiment of the present invention, shown in conjunction with an illumination prism assembly and a color splitting prism assembly.

Although the previous embodiments of a projections lens have used only spherical lenses, additional embodiments may use one or more ashperical lenses. FIG. 9 is a schematic view of a projection lens 900 comprising a four-element objective group 902 and a four-element telecentric group 904. Data for each of the elements of lens 900 is detailed in Table 5. Projection lens 900 has a field of view of 73 degrees, a back focal distance of 3.30 inches, an overall length of 11.06 inches, a distortion of less than 0.25%, and a principal image to ghost image intensity ratio of greater than 700:1.

The back surface of lens 908. and the front surface of lens 920, are ashperical surfaces that are represented by:

$$Z = \frac{ch^2}{1 + \sqrt{(1 - (1+k)c^2h^2)}} + Ah^4 + Bh^6 + Ch^8 + Dh^{10}$$

where: Z is the sag of the surface parallel to the Z axis;
c is the curvature at the pole of the surface (1/radius of curvature);
k is the conic coefficient;
A,B,C,D are the 4th, 6th, 8th, and 10th order deformation coefficients; and
h is the distance from the Z axis.

TABLE 5

| Object | Front Radius of Curvature | Rear Radius of Curvature | Diameter | Thickness | Material |
| --- | --- | --- | --- | --- | --- |
| Lens 906 | 2.86230 | 1.53370 | 1.820 | 0.197 | SK5 |
| Air Gap | | | | 0.863 | |
| Lens 908 | 1.19976 | 5.344693 (Aspheric) | 1.380 | 0.197 | Acrylic |
| k = −0.967642; A = 0; B = −1.40826 E-2; C = 36.4300 E-4; D = −3.05203 E-3 | | | | | |
| Air Gap | | | | 5.345 | |
| Lens 910 | −11.64851 | 3.30446 | 0.630 | 0.197 | LAF2 |
| Lens 912 | 3.30446 | −2.74592 | 0.610 | 0.403 | SF1 |
| Air Gap | | | | 0.866 | |
| Stop | | | 0.449 | | |
| Air Gap | | | | 1.252 | |
| Lens 914 | −10.45400 | −1.32970 | 0.770 | 0.403 | BK7 |
| Lens 916 | −1.32970 | Infinite | 0.870 | 0.197 | SF4 |
| Air Gap | | | | 0.083 | |
| Lens 918 | 5.41660 | −2.39000 | 0.980 | 0.534 | BK7 |
| Air Gap | | | | 0.079 | |
| Lens 920 | 4.57456 | −3.26968 (Aspheric) | 1.020 | 0.440 | Acrylic |
| k = −5.770599; A = 0; B = 3.38424 E-3; C = 1.60468 E-4; D = −3.05656 E-4 | | | | | |

Projection lens assembly 900, as described above in Table 5, has a throw ratio of 1.2:1 and a magnification of approximately 269×. Projection lens 900 operates at about f/3.0 with no vignetting and has a nominal MTF of 0.62 on axis, at 33 lp/mm. The off-axis MTF is 0.52 in the tangential direction and 0.80 in the radial orientation at 33 lp/mm. Projection lens 900 is designed for SVGA systems with full vertical offset and has a BFD/EFL ratio of approximately 5.0:1.

Thus, although there has been disclosed to this point a particular embodiment for a projection lens assembly, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A reverse telephoto offset projection lens, said projection lens having an objective end and an opposite modulator end, said reverse telephoto offset projection lens comprising:

a telecentric lens group at said modulator end of said projection lens for receiving light from said modulator end, said telecentric lens group being telecentric in modulator space; and a objective lens group at said objective end of said projection lens; and wherein said objective lens group and said telecentric lens group are selected to to provide an air equivalent back focal distance of at least 3.3 inches.

2. The lens of claim 1 having a back focal distance to effective focal length ratio of at least 0.86:1.

3. The lens of claim 1 having a back focal distance to effective focal length ratio of at least 1.2:1.

4. The lens of claim 1 having a back focal distance to effective focal length ratio of at least 1.5:1.

5. The lens of claim 1 having a throw ratio of at least 1.2:1.

6. The lens of claim 1 having a throw ratio of at least 5:1.

7. The lens of claim 1 having a field of view of at least 14 degrees.

8. The lens of claim 1 having a field of view of at least 20 degrees.

9. The lens of claim 1 having a field of view of at least 73 degrees.

10. The lens of claim 1 having an air equivalent back focal distance of at least 4.3 inches.

11. The lens of claim 1 having a back focal distance to effective focal length ratio of at least 1.3:1.

12. The lens of claim 1 having a back focal distance to effective focal length ratio of at least 4.08:1.

13. The lens of claim 1 having a throw ratio of at least 1.2:1.

14. The lens of claim 1 having a throw ratio of at least 3.5:1.

15. The lens of claim 1 having a field of view of at least 25 degrees.

16. The lens of claim 1 having a field of view of at least 72 degrees.

17. The lens of claim 1 having a back focal distance to effective focal length ratio of 0.86:1, a throw ratio of 7:1, and a field of view of 14 degrees.

18. The lens of claim 1 having a back focal distance to effective focal length ratio of 1.2:1, a throw ratio of 5:1, and a field of view of 20 degrees.

19. The lens of claim 1 having a back focal distance to effective focal length ratio of 5.0:1, a throw ratio of 1.2:1, and a field of view of 73 degrees.

20. The lens of claim 1 having an air equivalent back focal distance of at least 4.3 inches, a back focal distance to effective focal length ratio of 1.3:1 a throw ratio of 3.5:1, and a field of view of 25 degrees.

21. The lens of claim 1 having an air equivalent back focal distance of at least 4.3 inches, a back focal distance to effective focal length ratio of 4.08:1, a throw ratio of 1.2:1, and a field of view of 72 degrees.

22. An image display system for projecting an image, said image display system comprising:

a light source for generating a beam of light;

a controller for generating electrical control signals;

a spatial light modulator for receiving said electrical control signals and for selectively modulating said beam of light in response to said electrical control signals;

a prism assembly for transmitting said selectively modulated beam of light; and a reverse telephoto projection lens for focusing said selectively modulated beam of light, said reverse telephoto projection lens telecentric in modulator space and providing an air equivalent back focal distance of at least 3.3 inches.

23. The image display system of claim 22, said spatial light modulator having a diagonal dimension of at least 0.7 inches.

24. The image display system of claim 22, said spatial light modulator having a diagonal dimension of at least 1.1 inches.

25. The image display system of claim 22, said spatial light modulator defining a vertical frame height, and said reverse telephoto projection lens providing an offset of at least 50% of the vertical frame height.

26. The image display system of claim 22, said spatial light modulator having a diagonal dimension of at least 0.7 inches, said reverse telephoto projection lens having a back focal distance to effective focal length ratio of 0.86:1, a throw ratio of 7:1, and a field of view of 14 degrees.

27. The image display system of claim 22, said spatial light modulator having a diagonal dimension of at least 0.7 inches, said reverse telephoto projection lens having a back focal distance to effective focal length ratio of 1.2:1, a throw ratio of 5:1, and a field of view of 20 degrees.

28. The image display system of claim 22, said spatial light modulator having a diagonal dimension of at least 0.7 inches, said reverse telephoto projection lens having a back focal distance to effective focal length ratio of 5.0:1, a throw ratio of 1.2:1, and a field of view of 73 degrees.

29. The image display system of claim 22, said spatial light modulator having a diagonal dimension of at least 1.1 inches, said reverse telephoto projection lens having an air equivalent back focal distance of at least 4.3 inches, a back focal distance to effective focal length ratio of 1.3:1, a throw ratio of 3.5:1, and a field of view of 25 degrees.

30. The image display system of claim 22, said spatial light modulator having a diagonal dimension of at least 1.1 inches, said reverse telephoto projection lens having an air equivalent back focal distance of at least 4.3 inches, a back focal distance to effective focal length ratio of 4.08:1, a throw ratio of 1.2:1, and a field of view of 72 degrees.

* * * * *

UNITED STATES PATENT AND TRADEMARK OFFICE
CERTIFICATE OF CORRECTION

PATENT NO. : 5,914,818                     Page 1 of 1
DATED : June 22, 1999
INVENTOR(S) : John A. Tejada, Douglas W. Anderson, and Patrick A. Trotta It is certified that error appears in the above-identified patent and that said Letters Patent is hereby corrected as shown below:

<u>Title page,</u>
Insert item [60] under Related U.S. Application Data
-- Provisional Application No. 60/031,525 Nov. 29, 1996. --

Signed and Sealed this

Twenty-first Day of August, 2001

Attest:

NICHOLAS P. GODICI
*Attesting Officer*     *Acting Director of the United States Patent and Trademark Office*